United States Patent
Madanapalli et al.

(10) Patent No.: US 9,354,917 B2
(45) Date of Patent: May 31, 2016

(54) METHOD AND SYSTEM FOR NETWORK-LESS GUEST OS AND SOFTWARE PROVISIONING

(71) Applicant: VMware, Inc., Palo Alto, CA (US)

(72) Inventors: Narendra Prasad Madanapalli, Bangalore (IN); Muzibur Shaik, Bangalore (IN); Reghuram Vasanthakumari, Bangalore (IN); Sriram Balasubramanian, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 253 days.

(21) Appl. No.: 13/973,761

(22) Filed: Aug. 22, 2013

(65) Prior Publication Data

US 2015/0058839 A1  Feb. 26, 2015

(51) Int. Cl.
    G06F 9/455  (2006.01)
    G06F 9/445  (2006.01)

(52) U.S. Cl.
    CPC .............. *G06F 9/45558* (2013.01); *G06F 8/60* (2013.01); *G06F 8/63* (2013.01); *G06F 2009/45562* (2013.01)

(58) Field of Classification Search
    CPC ................. G06F 9/45558; G06F 2009/45562; G06F 8/63; G06F 8/60
    See application file for complete search history.

(56) References Cited

U.S. PATENT DOCUMENTS

| | | | |
|---|---|---|---|
| 7,577,722 B1* | 8/2009 | Khandekar et al. | 709/220 |
| 8,046,550 B2* | 10/2011 | Feathergill | 711/162 |
| 8,707,301 B2* | 4/2014 | Fries | 718/1 |
| 2008/0034364 A1* | 2/2008 | Lam et al. | 718/1 |
| 2009/0077551 A1* | 3/2009 | Whiteley | 718/1 |
| 2009/0254890 A1* | 10/2009 | Kang et al. | 717/136 |
| 2010/0223368 A1* | 9/2010 | Runcie et al. | 709/222 |
| 2013/0167131 A1* | 6/2013 | Carson | 717/168 |
| 2013/0254759 A1* | 9/2013 | Xu et al. | 717/174 |
| 2013/0326505 A1* | 12/2013 | Shah | 718/1 |
| 2014/0040887 A1* | 2/2014 | Morariu et al. | 718/1 |

* cited by examiner

*Primary Examiner* — Lewis A Bullock, Jr.
*Assistant Examiner* — Jacob Dascomb

(57) ABSTRACT

Techniques are disclosed for network-less provisioning of guest operating system and software. In one embodiment, a monitor process mounts a floppy image or ISO storing a deployment tool on a virtual CD/DVD device or virtual floppy device, respectively, of a VM and powers on the VM. The deployment tool is invoked upon powering on of the VM and requests that the monitor mount an OS ISO image on the virtual CD/DVD device. In response, the monitor mounts the OS ISO and transmits an acknowledgment to the deployment tool, which initiates OS installation from the OS ISO image. After the OS installation, the deployment tool transmits a further request that monitor clean-up resources consumed during the OS installation and reboots the VM, after which a similar process may be undertaken to install software for the VM.

14 Claims, 3 Drawing Sheets

METHOD AND SYSTEM FOR NETWORK-LESS GUEST OS AND SOFTWARE PROVISIONING

BACKGROUND

A virtual machine (VM) is an abstraction—a virtualization—of an actual physical computer system. The VM, also known as the "guest," is installed on a host computer platform, which includes system hardware and one or more virtualization layers. Each VM is configured with its own operating system that runs on top of virtual system hardware as emulated by the virtualization layers.

Provisioning is the process of creating and deploying a virtual machine (VM), including assigning and configuring resources, such as processors, memory, network, and disk storage, associated with the VM. Much research has focused on VM provisioning, including provisioning based on hardware selection. However, operating system (OS) and software deployment on the provisioned VMs are still carried out manually by a system administrator.

Typically, operating systems are large, complex software packages which, when installed manually, is a lengthy and expensive process that drains productivity and also introduces the possibility of inadvertent errors. System administrators may set up dedicated provisioning infrastructures, such as Preboot eXecution Environment (PXE) infrastructures. However, much time and effort must be spent managing and supporting such infrastructures. PXE in particular requires networking services such as Dynamic Host Configuration Protocol (DHCP), Trivial File Transfer Protocol (TFTP), etc., and typically does not support communication between networks and isolated fragments of sub-networks. As a result, in virtual datacenter and virtual cloud environments having many isolated networks, such as virtual local area networks (VLANs) and sub-networks, multiple PXE boot infrastructures would need to be provisioned and managed.

SUMMARY

One embodiment of the invention includes a method for provisioning guest operating system and software. This method may generally include mounting, by a monitor process running in a hypervisor, one of a floppy and an ISO boot image on a virtual floppy or CD/DVD device, respectively, of a virtual machine (VM), the one of the floppy and the ISO boot image including a deployment tool. The method further includes powering on the VM by the monitor process, the deployment tool being invoked after the powering on. If an operating system (OS) ISO image has not yet been mounted on the virtual CD/DVD device for installation of the OS, the method includes requesting, by the deployment tool, the operating system (OS) ISO image be mounted on the CD/DVD device, the request being transmitted via a communication channel between the VM and the hypervisor, and, in response to the request, mounting, by the monitor process, the OS ISO image on the virtual CD/DVD device. In addition, the method includes initiating, by the deployment tool, installation of the OS from the mounted OS ISO image.

Further embodiments of the present invention include a computer-readable storage medium storing instructions that when executed by a computer system cause the computer system to perform the method set forth above, and a computer system programmed to carry out the method set forth above.

DETAILED DESCRIPTION

Figure 1:
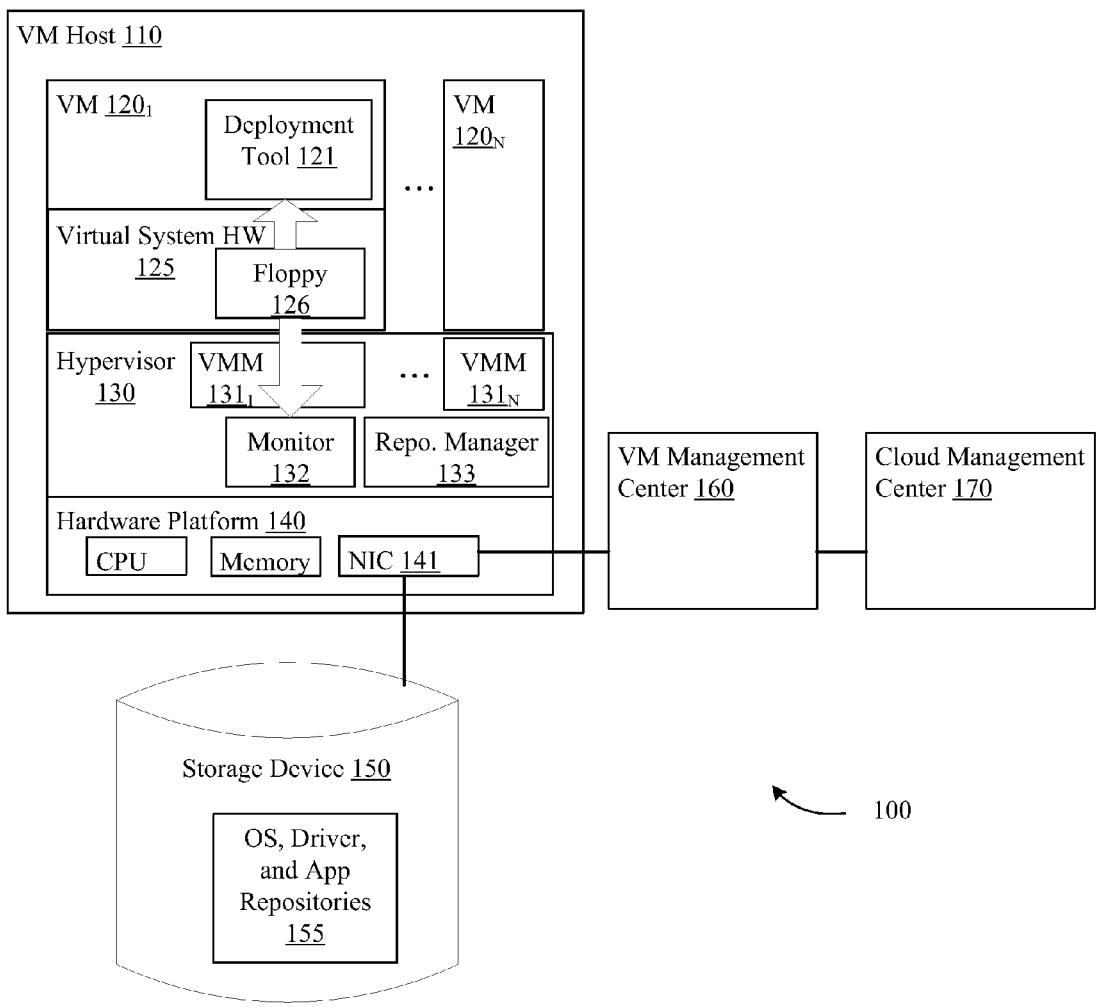
FIG. 1 illustrates a system on which one or more embodiments may be implemented.

Embodiments presented herein provide techniques for network-less provisioning of guest operating system (OS) and software. The network-less provisioning may generally include a monitor process ("monitor"), running on a hypervisor, providing support to a deployment tool, running in a VM, that installs the OS and software. Supporting tasks performed by the monitor may include, among other things, mounting/unmounting of floppy and ISO images for the OS and software that need to be installed, cleaning up resources used during the installation, and providing various status updates. The monitor and the deployment tool may communicate to each other during the installation process via a full-duplex channel that allows a guest VM to communicate with the hypervisor supporting the VM.

In one embodiment, the monitor may mount a floppy or ISO boot image storing a deployment tool on a virtual CD/DVD device or virtual floppy device, respectively, of a VM and power on the VM. A pre-installation environment invokes the deployment tool upon the powering on, and the deployment tool requests that the monitor mount an ISO image storing an operating system installation package (also referred to herein as "OS ISO image") on the virtual CD/DVD device. The monitor mounts the OS ISO image, as requested, and transmits an acknowledgment via the communication channel to the deployment tool, which then initiates OS installation from the OS ISO image. The deployment tool then reboots the VM, but only after transmitting a further request that the monitor clean-up resources consumed during the OS installation while the VM is powered off. After the reboot, a similar process may be undertaken to install software, namely deployment tool may request that the monitor process mount a ISO image storing a software installation package (also referred to herein as "software ISO image"), the monitor may mount such a software ISO and acknowledge the same, and the deployment tool may initiate installation of the software from the mounted software ISO.

As discussed, the communication channel, through which the monitor process and the deployment tool communicate, may be a full-duplex channel allowing a guest VM to communicate with the hypervisor supporting the VM. Requests may be placed in such a communication channel as a file that includes parameters, and acknowledgment that the request is accomplished may be placed in the channel in a similar way with pass/fail status. For example, the requests discussed above to mount ISO and floppy images during an OS and software provisioning process may be written to a file, with parameters identifying the particular ISO and floppy images to mount. Acknowledgments that the ISO and floppy images were successfully mounted, or that mounting was unsuccessful, may similarly be transmitted via the communication channel by writing a file (e.g., the same file that the requests were written to) with a parameter whose value indicates the success or failure. In one embodiment, a floppy image may be mounted on a virtual floppy device of the VM, and the requests and acknowledgments written to file(s) on the floppy.

In the following description, numerous specific details are set forth in order to provide a thorough understanding of the present invention. However, it will be apparent to one skilled in the art that the present invention may be practiced without some of these specific details. In other instances, well known process operations and implementation details have not been described in detail in order to avoid unnecessarily obscuring the invention.

FIG. 1 illustrates a system on which one or more embodiments may be implemented. As shown, a virtual infrastructure 100 includes a VM host computer 110, storage devices 150, a VM management center 160, and a cloud management center 170. Only one VM host and storage device are depicted for simplicity. In practice, a virtual infrastructure may include clusters of any number of VM hosts networked to shared storage, at any number of VM hosting sites.

Illustratively, VM host 110 and its hardware resources 140 (e.g., CPU, RAM, and network interface card (NIC) 141) support VMs $120_{1-N}$ through software interface layer (also referred to herein as a "hypervisor") 130 that enables sharing of hardware resources 140 by VMs $120_{1-N}$. Hypervisor 130 may run on top of an operating system of VM host 110 or directly on hardware components of VM host 110. Each of VMs $120_{1-N}$ may implement a virtual hardware platform which includes, e.g., virtual CPU(s), virtual memory, virtual disks, and virtual devices. The virtual devices may include virtual floppy devices and virtual CD/DVD devices which are used in OS and software provisioning, discussed in greater detail below. Virtual machine monitors (VMMs) $131_{1-N}$ provide hardware emulation for corresponding VMs to support system components such as the virtual CPU(s), virtual memory, virtual disks, and virtual devices. In addition, the virtual hardware platforms of VMs $120_{1-N}$ support execution of guest operating systems and client application programs running on the guest operating systems. Examples of guest operating systems include the Microsoft Windows® and Linux® operating systems.

VM management center 160 is a computer program that resides and executes in a central server, which may exist as a separate computing system dedicated for this purpose. Alternatively, VM management center 160 may execute on one of the VM hosts 110. VM management center 160 communicates with VM host 110, and carries out administrative tasks including, but not limited to, managing VM host 110, managing VMs $120_{1-N}$ running within VM host 110, provisioning VMs, migrating VMs from one VM host to another, allocating physical resources (e.g., processor and memory), load balancing between VM hosts, and so on. Cloud management center 170 may carry out similar administrative tasks and manage one or more VM management centers.

In one embodiment, VM management center 160 and/or cloud management center 170 may provide a user interface for provisioning VMs, including virtual hardware to provision to the VM. The user interface may be, e.g., a wizard-driven VM provisioning interface. This user interface may further provide options for provisioning operating systems, software applications, etc. along with the provisioning of VMs. In one embodiment, such provisioning of the OS, applications, etc. may be performed by a monitor process 132 in conjunction with a deployment tool 121, which communicate via a full-duplex communication channel 127.

As shown, the communication channel 127 between deployment tool 121 and monitor 132 is through virtual floppy device 126. Requests may be placed in communication channel 127 as a file that includes parameters (e.g., identifying an ISO or floppy image to be mounted), and acknowledgments may be placed in the channel in a similar fashion with pass/fail status. In one embodiment, a floppy image may be mounted on virtual floppy device 126, and the requests and acknowledgments written to file(s) on the floppy. In practice, the floppy image itself may be stored as a file on shared storage device 150, and monitor 132 and other hypervisor components may read and write to such a file. The same file may be presented to VMs (e.g., VM $120_1$) as a floppy disk, which the VMs, and deployment tool 121 running on a VM, may read and write to.

For OS and software provisioning, monitor 132 may mount a floppy or ISO boot image storing deployment tool 121 on a CD/DVD device or virtual floppy device 126 of VM $120_1$, and then power on the VM. Upon powering on of VM $120_1$, deployment tool 121 is invoked to begin OS deployment. In one embodiment, deployment tool 121 may request via communication channel 127 that monitor 132 mount an ISO image on the CD/DVD device, the ISO storing an operating system installation package. In response, monitor 132 may mount the ISO image and transmit an acknowledgment to deployment tool 121 via communication channel 127. In one embodiment, the OS ISO image, as well as ISO images storing software installation packages, boot images, and other images or files used to deploy OS and software, may be stored in a repository 155 of a shared storage device 150. In one embodiment, storage device 150 may be a datastore shared across VM hosts in a cloud. A repository manager 133 manages metadata about the OS distributions and software stored in the repository 155.

After the OS ISO is mounted, deployment tool 121 may install the OS from the OS ISO image. After the OS is installed, deployment tool 121 may transmit a further request via communication channel 127 that monitor 132 clean up resources consumed during the OS installation and reboot VM $120_1$. Such clean-up may include unmounting the OS ISO image, and monitor 132 may further change the boot order to boot from disk. Upon rebooting VM $120_1$, a similar process may be undertaken to install software. For example, deployment tool 121 may request a software ISO image to be mounted via communication channel 127. Monitor 132 may perform this action and transmit an acknowledgment, after which deployment tool 121 may initiate installation of the software.

Figure 2:
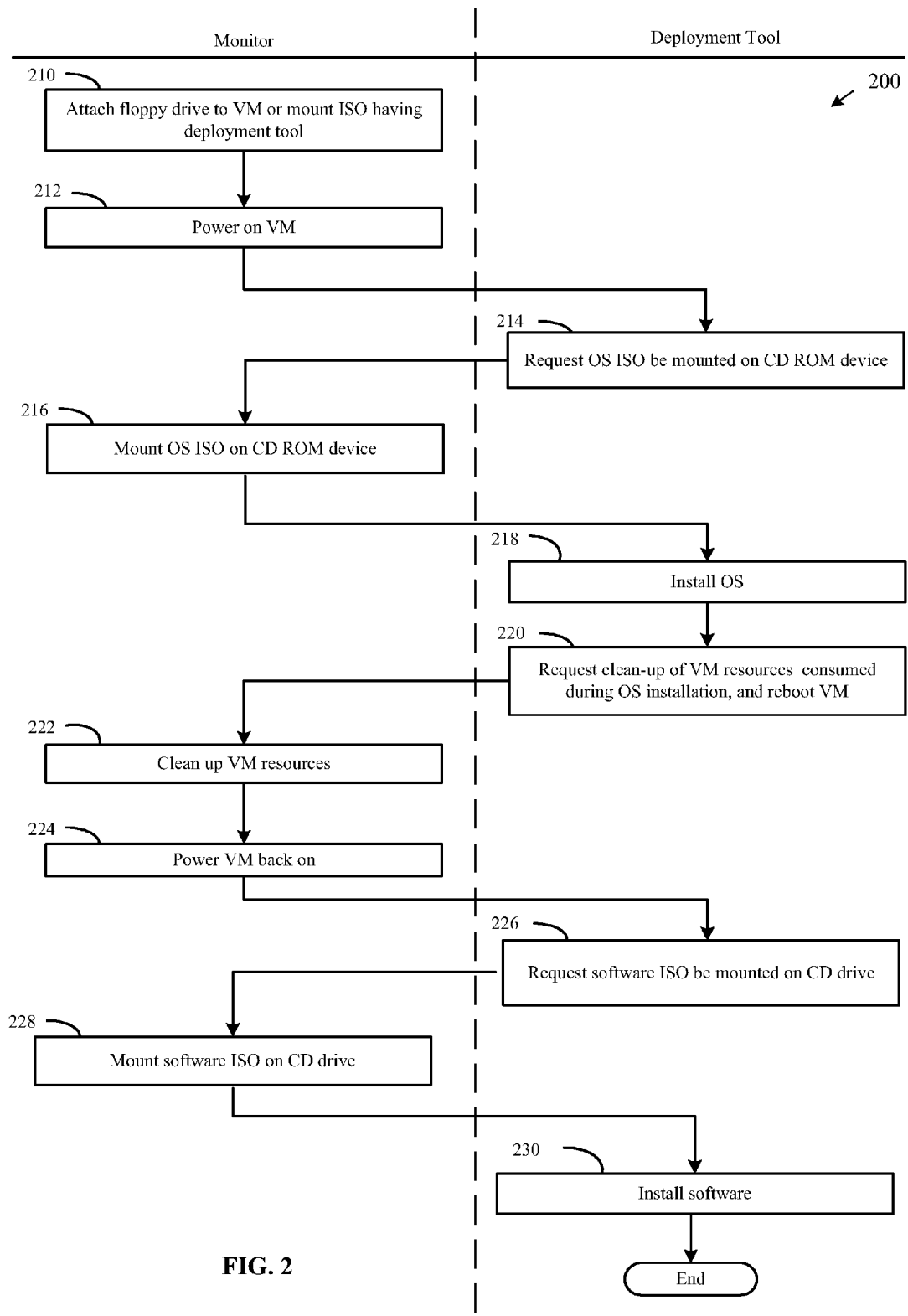
FIG. 2 illustrates a method for provisioning operating system and software on a virtual machine, according to an embodiment.

FIG. 2 illustrates a method 200 for provisioning operating system and software on a virtual machine, according to an embodiment. As shown, the method 200 begins at step 210, where monitor 132 causes a floppy or CD boot image which includes deployment tool 121 to be mounted onto the VM's CD/DVD drive or virtual floppy device, respectively. Monitor 132 may request hypervisor 130 to perform such mounting, and one or more components of hypervisor 130 may do so according to well-known techniques. In the Windows® operating system, for example, a pre-installation (PE) boot disk may be mounted on the VM's virtual CD/DVD device. In the Linux® operating system, a bootable disk storing the pre-installation environment may be mounted on the VMs virtual floppy device, and the boot order in the BIOS changed to boot from the virtual floppy device on powering on.

At step 212, monitor 132 powers on the VM. Upon being powered on, the VM boots from the virtual CD/DVD or floppy device and executes deployment tool 121 stored on the boot disk mounted at step 210. In Windows, for example, the pre-installation environment may be booted up from the PE boot disk, and deployment tool 121 invoked to begin OS deployment. Note, the monitor 132 may also change the boot order in BIOS of the VM to boot from the virtual CD/DVD or floppy device if the BIOS is not so configured.

At step 214, deployment tool 121 requests an OS ISO be mounted on the virtual CD/DVD device. In one embodiment, a mounted floppy image may serve as a full-duplex channel of communication for the VM to communicate with hypervisor 130. Requests may be placed in the communication channel as a file that includes parameters, and acknowledgment that the requested action was performed successfully, or that the requested action was not successfully performed, may be placed in the channel in a similar way with pass/fail status. In one embodiment, file(s) on the floppy image may be written to with the request and acknowledgment messages. In such a case, the request to mount the OS ISO image may be written as a file on the floppy, the file having a command for mounting an ISO image and a parameter that identifies the OS ISO as the image to mount. Note, step 214 may be not be performed in some embodiments. For example, to install the Linux® operating system, monitor 132 may initially mount both a Linux bootable disk image on the floppy and a Linux distribution ISO on the CD/DVD device. Monitor 132 may then power on the VM to begin Linux® installation.

At step 216, monitor 132 mounts the OS ISO image on the virtual CD/DVD device in response to deployment tool's 121 request and sends an acknowledgment. In one embodiment, monitor 132 may continuously monitor the floppy image to which requests and acknowledgments are written, which may appear to monitor 132 as a file. That is, monitor 132 monitors the file representing the floppy and responds to requests by deployment tool 110 written to the virtual floppy device file. As discussed, such requests may include mounting the OS ISO on the VM's CD/DVD device, in response to which monitor 132 may retrieve the OS ISO image from repository 155 of shared storage device 150, in which the ISO image is stored, and mount the retrieved OS ISO on the CD/DVD device. After mounting the OS ISO, as requested, or failing to do so, monitor 132 may transmit a reply via communication channel 127. The reply may include, for example, an acknowledgement command and a parameter whose value indicates whether the requested action was performed successfully.

At step 218, deployment tool 121 initiates installation of the OS from the mounted OS ISO image in response to the acknowledgment, assuming that the acknowledgment indicates that the OS ISO image was mounted successfully. In the Windows® operating system, for example, monitor 132 may pass an unattend.xml or unattend.txt answer file containing settings for the OS installation to a setup process as one of its arguments, thereby initiating Windows® operating system setup. Installation of the OS may be initiated in other ways, depending on the OS being deployed. Note, monitor 132 may proactively check on the installation via communication channel 127. For example, if OS installation is taking a long time, monitor 132 may request a status update from deployment tool 121 via communication channel 127. That is, statuses and other reporting may be requested, and responses thereto provided, through communication channel 127.

At step 220, deployment tool 121 requests clean-up of VM resources consumed during installation of the OS, and reboots the VM. This clean-up of resources may include unmounting an ISO image and/or a floppy image from the virtual CD/DVD and floppy devices, respectively. In addition, the VM's boot order may also be changed to boot from hard disk. Similar to requests for floppy or ISO images to be mounted, deployment tool 121 may communicate the request to clean up resources consumed during OS installation via communication channel 127. In one embodiment, deployment tool 121 may write the request to a file on a floppy image.

At step 222, monitor 132 cleans up VM resources used during the OS installation, which, as discussed, may include unmounting the OS ISO and/or the floppy image and changing the VM's boot order to boot from hard disk. At step 224, monitor 132 powers the VM back on, at which point deployment tool 121 may be launched again to perform any custom post-OS deployment tasks. Here, deployment tool 121 may communicate, via channel 127, to monitor 132 that OS installation has been completed.

At step 226, deployment tool 121 requests a software ISO image be mounted on the virtual CD/DVD device. This software ISO may include custom packages and software applications. In response to the deployment tool's 121 request, monitor 132 mounts the software ISO on the virtual CD/DVD device at step 228, and transmits an acknowledgement via communication channel 127. Similar to mounting the OS ISO, discussed above, monitor 132 may retrieve the software ISO image from repository 155 of shared storage device 150, mount the retrieved ISO image on the virtual CD/DVD device, and write, to a file on the virtual floppy, a parameter whose value indicates whether the software ISO was successfully mounted.

At step 230, deployment tool 121 installs the software from the mounted software ISO. Although discussed with respect to deployment tool 121, it should be understood that the mounting of some software ISOs and the installation of associated software may actually be initiated by a second deployment tool which runs in the deployed OS context and which is itself deployed as software by the deployment tool that deployed the OS. In such cases, the second deployment tool may also communicate with monitor 132 via communication channel 127, as appropriate. In further embodiments, deployment tool 121 may access custom packages and software applications directly from the VM's local disk or from shared datastore 150, instead of from a mounted ISO. For example, rather than mounting an ISO, deployment tool 121 may request the custom packages and software applications to be written to the VM's disk, and thereafter access those packages and applications from the disk. As another example, rather than mounting the software ISO, monitor 132 may directly mount a shared datastore (e.g., shared datastore 150), which stores software installation packages. Deployment tool 121 may then deploy software from the shared datastore.

Figure 3:
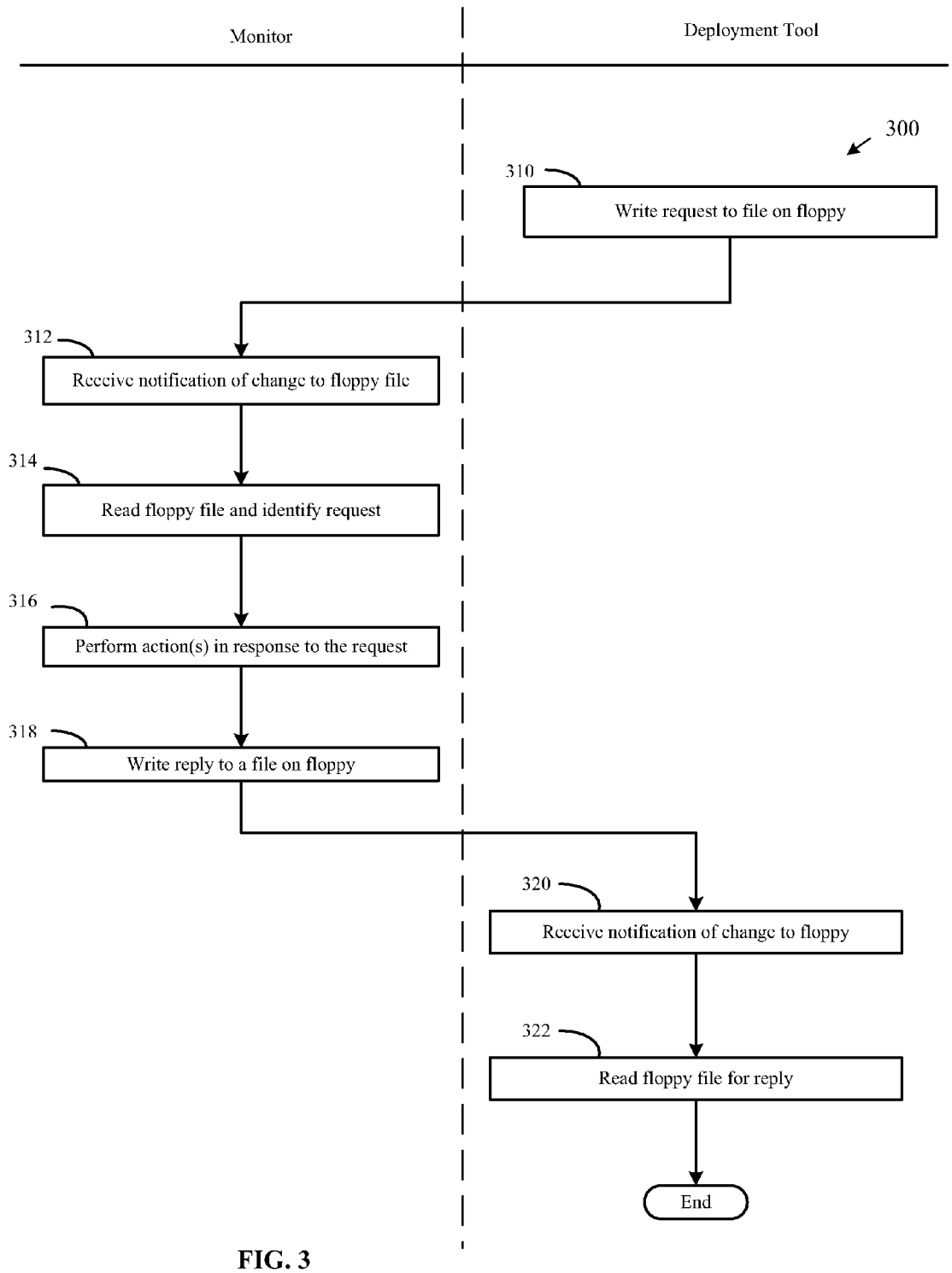
FIG. 3 illustrates a method for communicating via a virtual floppy device, according to an embodiment.

FIG. 3 illustrates a method 300 for communicating via a virtual floppy device, according to an embodiment. As shown, the method 300 begins at step 310, where deployment tool 121 writes a request to a file on a floppy disk. In one embodiment, the request may be written as a file with parameters on the floppy disk. For example, a request to mount an ISO or floppy image during an OS and software provisioning process may be written to such a file, with parameters identifying the particular ISO or floppy image to mount. Acknowledgment that the ISO or floppy image was successfully mounted, or that mounting was unsuccessful, may similarly be transmitted via the communication channel by writing a file with a parameter whose value indicates the success or failure.

At step 312, monitor 132 receives a notification of change to the floppy file. Monitor 132 may receive an event notification from a hypervisor 130 component, for example, upon the deployment tool 121 writing to the floppy disk. As discussed, the floppy image may appear to deployment tool 121 as a floppy disk and to monitor 132 as a file. As a result, monitor 132 monitors the floppy image file, and receives notifications about file modifications.

At step 314, monitor 132 reads the floppy file and identifies the request. As discussed, the request may itself be a file with parameters. Any feasible protocol that includes request and reply commands may be used. Examples of communication protocol commands useful for OS and software deployment, discussed above, include: request commands "req-mount-iso," "req-unmount-iso," "req-mount-floppy," "req-unmountfloppy," "req-status," "req-cp-file," and reply commands "ack-mount-iso," "ack-unmount-iso," "ack-mount-floppy," "ack-unmount-floppy," "ack-status," "ack-cp-file." After receiving the notification of the change to the floppy file, monitor 132, which knows the communication protocol being used, may read said file and identify request(s) written thereon.

At step 316, monitor 132 performs action(s) in response to the request. During OS and software deployment, for example, the request may relate to mounting/unmounting ISO or floppy images to support installation of the OS and software by deployment tool 121. Monitor 132 may perform such mounting/unmounting of ISO or floppy images in response to receiving the associated requests.

At step 318, monitor 132 writes a reply to a file on the floppy. For example, monitor 132 may write a file with pass/fail status, depending on whether monitor 132 performed the requested action successfully at step 316. In one embodiment, monitor 132 may write to the same file as that written to by deployment tool 121.

At step 320, deployment tool 121 receives notification that the floppy has been modified. Then, at step 322, deployment tool 121 reads the floppy to identify the reply written by monitor 132. Appropriate action may then be taken by deployment tool 121 based on whether the requested action was performed successfully. For example, if a requested OS or software ISO image was successfully mounted, then deployment tool 121 may proceed with installing the OS or software from the ISO image. Alternatively, if the requested OS or software ISO image was not successfully mounted, deployment tool 121 may issue a request to retry the mounting, display a notification to a user, etc.

Although discussed above with respect to using a virtual floppy device as a communication channel between VMs and hypervisors on which the VMs run, other storage devices may be used in lieu of virtual floppy devices. For example, file(s) with parameters may instead be written to a virtual flash device to communicate between the VMs and the hypervisor. Although discussed above primarily with respect to provisioning OS and software in conjunction with VM provisioning, software may also be provisioned at later times using similar techniques. For example, an API may be provided which can be invoked to provision additional software by requesting monitor 132 to mount software ISOs, and installing the software from the mounted ISOs. In addition, although discussed above with respect to provisioning OS and software, the communication channel via the storage device (e.g., the virtual floppy device) may generally be used for any communication between a hypervisor and a VM running thereon. For example, the VM may request that the hypervisor copy a file via the communication channel. As another example, the communication channel may be used to manage guest OS or software.

Advantageously, embodiments described herein provide network-less OS and software provisioning. No additional provisioning infrastructure is required for OS and software deployment (in contrast to deployment approaches based on PXE), making such deployment scalable across virtual environments in which many VLANs and other networks may be present. Further, the only communication is between guest and host, which does not require a network, and the elimination of networking improves security. In addition, embodiments described herein permit OS and software deployment to be provided in conjunction with VM provisioning, instead of being set up manually after the VM is provisioned.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for provisioning guest operating system and software, comprising:
   mounting, by a monitor process running in a hypervisor, one of a floppy or an ISO boot image for a virtual machine (VM), on one of a virtual floppy or virtual CD/DVD device, wherein the one of the floppy or the ISO boot image includes a deployment tool;
   powering on the VM, by the monitor process, wherein the deployment tool is automatically invoked upon the powering on;
   in response to a determination by the deployment tool that an operating system (OS) ISO image is not mounted on the virtual CD/DVD device:
      transmitting, by the deployment tool, a request that the OS ISO image be mounted on the virtual CD/DVD device, wherein the request is transmitted via a communication channel between the VM and the hypervisor, and wherein all request and reply messages between the VM and the hypervisor in the communication channel are written to a file on one of the floppy or another virtual storage device, and
      in response to the request, mounting, by the monitor process, the OS ISO image on the virtual CD/DVD device;
   in response to the mounting, initiating, by the deployment tool, installation of the OS from the mounted OS ISO image, wherein the installation utilizes resources associated with a host executing the VM;
   subsequent to the installation, rebooting the VM and requesting via the communication channel by the deployment tool, clean-up of the resources consumed during the OS installation;
   in response to the request to clean up resources, cleaning up the resources;
   after the clean-up of the resources, requesting, by the deployment tool via the communication channel, that a software ISO image be mounted on the virtual CD/DVD device;
   in response to the request that the software ISO image be mounted, mounting, by the monitor process, the software ISO image;
   transmitting, by the monitor process via the communication channel, an acknowledgment of the mounting of the software ISO image, wherein the acknowledgement includes an indication of success written as a message to the file on the one of the floppy or the another virtual storage device;
   reading, by the deployment tool, the file on the one of the floppy or the another virtual storage device to determine if the software ISO image was successfully mounted; and
   initiating, upon a determination by the deployment tool that the software ISO image was successfully mounted, installation of software from the software ISO image.

2. The method of claim 1, further comprising, after the OS ISO image is mounted, transmitting, by the monitor process via the communication channel, an acknowledgment of the mounting of the OS ISO image.

3. The method of claim 1, wherein the deployment tool and the monitor process each monitor changes in the one of the floppy or the another virtual storage device and read the one of the floppy or the another virtual storage device upon receiving notification of a change.

4. The method of claim 1, wherein the mounting of the one of the floppy and the ISO boot image that includes the deployment tool occurs substantially immediately after the VM is provisioned.

5. The method of claim 3, wherein the OS ISO image to be mounted is selected by a system administrator using a same user interface as that used for provisioning hardware of the VM.

6. The method of claim 1, further comprising, requesting, by the monitor process via the communication channel, an update of the progress of the OS installation during the OS installation.

7. A non-transitory computer-readable storage medium embodying computer program instructions for provisioning guest operating system and software, the operations comprising:
   mounting, by a monitor process running in a hypervisor, one of a floppy or an ISO boot image for a virtual machine (VM), on one of a virtual floppy or virtual CD/DVD device, wherein the one of the floppy or the ISO boot image includes a deployment tool;
   powering on the VM by the monitor process, wherein the deployment tool is invoked upon the powering on;
   in response to a determination by the deployment tool that an operating system (OS) ISO image is not mounted on the virtual CD/DVD device:
      transmitting, by the deployment tool, a request that the operating system OS ISO image be mounted on the virtual CD/DVD device, wherein the request is transmitted via a communication channel between the VM and the hypervisor, and wherein all request and reply messages between the VM and the hypervisor in the communication channel are written to a file on one of the floppy or another virtual storage device, and
      in response to the request, mounting, by the monitor process, the OS ISO image on the virtual CD/DVD device;
   in response to the mounting, initiating, by the deployment tool, installation of the OS from the mounted OS ISO image, wherein the installation utilizes resources associated with a host executing the VM;
   subsequent to the installation, rebooting the VM and requesting via the communication channel by the deployment tool, clean-up of the resources consumed during the OS installation;
   in response to the request to clean up resources, cleaning up the resources;
   after the clean-up of the resources, requesting, by the deployment tool via the communication channel, that a software ISO image be mounted on the virtual CD/DVD device;
   in response to the request that the software ISO image be mounted, mounting, by the monitor process, the software ISO image;

transmitting, by the monitor process via the communication channel, an acknowledgment of the mounting of the software ISO image, wherein the acknowledgement includes an indication of success written as a message to the file on the one of the floppy or the another virtual storage device;

reading, by the deployment tool, the file on the one of the floppy or the another virtual storage device to determine if the software ISO image was successfully mounted; and initiating, upon a determination by the deployment tool that the software ISO image was successfully mounted, installation of software from the software ISO image.

8. The computer-readable storage medium of claim 7, the operations further comprising, after the OS ISO image is mounted, transmitting, by the monitor process via the communication channel, an acknowledgment of the mounting of the OS ISO image.

9. The computer-readable storage medium of claim 7, wherein the deployment tool and the monitor process each monitor changes in the one of the floppy or the another virtual storage device and read the one of the floppy or the another virtual storage device upon receiving notification of a change.

10. The computer-readable storage medium of claim 7, wherein the mounting of the one of the floppy and the ISO boot image that includes the deployment tool occurs substantially immediately after the VM is provisioned.

11. The computer-readable storage medium of claim 10, wherein the OS ISO image to be mounted is selected by a system administrator using a same user interface as that used for provisioning hardware of the VM.

12. The computer-readable storage medium of claim 7, the operations further comprising, requesting, by the monitor process via the communication channel, an update of the progress of the OS installation during the OS installation.

13. A system, comprising:
a processor; and
a memory, wherein the memory includes a program for reducing perceived read latency, the program being configured to perform operations for provisioning guest operating system and software:
mounting, by a monitor process running in a hypervisor, one of a floppy or an ISO boot image for a virtual machine (VM), on one of a virtual floppy or virtual CD/DVD device, wherein the one of the floppy or the ISO boot image includes a deployment tool;
powering on the VM by the monitor process, by the monitor process, wherein the deployment tool is invoked upon the powering on;

in response to a determination by the deployment tool that an operating system (OS) ISO image is not mounted on the virtual CD/DVD device:
transmitting, by the deployment tool, a request that the operating system OS ISO image be mounted on the virtual CD/DVD device, wherein the request is transmitted via a communication channel between the VM and the hypervisor, and wherein all request and reply messages between the VM and the hypervisor in the communication channel are written to a file on one of the floppy or another virtual storage device, and
in response to the request, mounting, by the monitor process, the OS ISO image on the virtual CD/DVD device, in response to the mounting, initiating, by the deployment tool, installation of the OS from the mounted OS ISO image, wherein the installation utilizes resources associated with a host executing the VM;

subsequent to the installation, rebooting the VM and requesting via the communication channel by the deployment tool, clean-up of the resources consumed during the OS installation;

in response to the request to clean up resources, cleaning up the resources;

after the clean-up of the resources, requesting, by the deployment tool via the communication channel, that a software ISO image be mounted on the virtual CD/DVD device;

in response to the request that the software ISO image be mounted, mounting, by the monitor process, the software ISO image;

transmitting, by the monitor process via the communication channel, an acknowledgment of the mounting of the software ISO image, wherein the acknowledgement includes an indication of success written as a message to the file on the one of the floppy or the another virtual storage device;

reading, by the deployment tool, the file on the one of the floppy or the another virtual storage device to determine if the software ISO image was successfully mounted; and initiating, upon a determination by the deployment tool that the software ISO image was successfully mounted, installation of software from the software ISO image.

14. The system of claim 13, the operations further comprising, after the OS ISO image is mounted, transmitting, by the monitor process via the communication channel, an acknowledgment of the mounting of the OS ISO image.

* * * * *